3,174,903
PREPARATION OF HEPARINOIDS
Edmundo Fischer, Jorge Luis José Szabo, and Peter Pal Stark, Buenos Aires, Argentina, assignors to Szabo Hnos. Kessler & Cia. S.R.L., Buenos Aires, Argentina, a company of Argentina
No Drawing. Filed Sept. 14, 1961, Ser. No. 137,960
12 Claims. (Cl. 167—74)

This invention relates to the preparation of heparinoids. More specifically, it relates to the preparation of heparinoids from duodenum.

Frozen duodenum was thawed, comminuted and passed through a colloid mill after which it was extracted, centrifuged to obtain a liquid which was subsequently filtered, neutralized and centrifuged. The remaining clear liquid was agitated with a precipitant such as zinc sulfate or other zinc salts or hydroxide after which a grey precipitate formed. After standing overnight, the precipitate was removed by centrifuging and the remaining liquid discarded. The precipitate was then dissolved in a standard buffer solution, agitated and heated, the residue being then removed by centrifuging and discarded. The remaining liquid extract was precipitated with alcohol above room temperature. After standing for two days, it was centrifuged. The precipitate was then dried, ground and sifted, the yield being about 1%.

The invention is illustrated by the following non-limitative example.

*Example*

200 grams of frozen duodenum is thawed, cut in small pieces, passed through a colloid mill and then extracted with a solvent consisting of 19 grams of sodium hydroxide and 6.2 grams of common salt in 660 milliliters of water. This mixture is heated to about 50° to 70° C. and preferably about 60° C. for 15 minutes during which time it is being mechanically mixed. At the end of 15 minutes the mixture is quickly cooled to 45° C. and allowed to stand overnight to facilitate removal of the fat layer. After removal of the fat layer, the remaining liquid is filtered, neutralized to a pH of 7.8 with 40 milliliters of concentrated hydrochloric acid and then centrifuged, the formed precipitate being discarded.

To the remaining clear liquid 50 grams of zinc sulphate are added during continuous agitation, the agitation being continued for a half hour after the zinc salt is completely dissolved. A grey precipitate is then formed. After standing overnight, this grey precipitate is removed by centrifuging and the remaining liquid is discarded. This precipitate is dissolved in a standard buffer solution of 200 milliliters of disodium acid and phosphate and sodium dihydrogen phosphate of pH 7.8, agitated and heated to about 50° to 70° C. and preferably about 60° C. for half an hour, after which the formed residue is removed by centrifuging and discarded. The remaining liquid is precipitated with 360 milliliters of 95% alcohol. After standing for two days the precipitate is centrifuged, dried, ground and sifted. Yield 1%—about 2 grams.

This powdered heparinoid has been tested chemically and biologically. Especially significant are the excellent results achieved upon precipitation with toluidine blue and protamine determining the amount of precipitate colorimetrically and gravimetrically respectively. Moreover, a solution of the powder was assayed by paper chromatography and paper electrophoresis comparing the results with those obtained by using a standard preparation. Extremely favorable results were obtained.

The biological tests used consisted of giving a certain quantity of heparinoid to rats and rabbits orally and parenterally. At given intervals blood was extracted from the animals, oxalate being used to prevent coagulation. The plasma so obtained has the unexpected but significant property of cleaning up lipemic sera, milk or artificial lipoproteinic mixture.

While certain of the claims set forth definite amounts of ingredients it is to be understood that the invention is not limited thereto since multiples and fractional amounts can also be employed.

What is claimed is:
1. A method of preparing heparinoids which comprises the steps of:
   (a) thawing frozen comminuted duodenum;
   (b) extracting said duodenum with a solvent consisting of sodium hydroxide and common salt in water;
   (c) heating the extract to 50–70° C.;
   (d) cooling to 45° C.;
   (e) filtering the mixture;
   (f) neutralizing the filtrate to a pH of 7.8 with concentrated hydrochloric acid;
   (g) centrifuging the neutralized filtrate;
   (h) adding a zinc-containing precipitant to the clear liquid obtained to form a grey precipitate which is kept overnight;
   (i) centrifuging the precipitate;
   (j) removing the precipitate;
   (k) dissolving said precipitate in a standard buffer solution of pH 7.8;
   (l) agitating the dissolved precipitate;
   (m) heating to 50–70° C.;
   (n) centrifuging the heated precipitate;
   (o) removing the residue;
   (p) adding alcohol to the remaining liquid to form a final precipitate;
   (q) centrifuging the final precipitate;
   (r) drying the centrifuged final precipitate;
   (s) grinding the dried precipitate; and
   (t) sifting the ground precipitate.
2. A method according to claim 1 wherein the quantity of solvent consisting of sodium hydroxide and common salt in water used is in the ratio of nineteen grams of sodium hydroxide, 6.2 grams of common salt in 660 milliliters of water for every 200 grams of frozen duodenum.
3. A method according to claim 1 comprising the additional step of mechanically mixing the extracting solution and heating it to 50–70° C. for at least fifteen minutes.
4. A method according to claim 3 comprising the additional steps of:
   (a) quickly cooling the heated extracting solution to below 50° C.;
   (b) keeping the cooled solution in a vessel overnight;
   (c) removing the fat layer formed;
   (d) filtering the remaining liquid; and
   (e) neutralizing the filtered liquid.
5. A method according to claim 4 wherein the neutralizer is concentrated hydrochloric acid and the filtered liquid is neutralized to a pH of 7.8.
6. A method according to claim 1 wherein the zinc-containing precipitant is zinc sulphate.
7. A method according to claim 1 wherein the standard buffering solution consists of disodium acid phosphate and sodium dihydrogen phosphate.
8. A method according to claim 5 wherein hydrochloric acid is used in the ratio of 40 milliliters for every 200 grams of frozen duodenum.
9. A method according to claim 6 wherein the zinc sulphate is used in the ratio of 50 grams for every 200 grams of frozen duodenum.
10. A method according to claim 7 wherein the quantity of buffer solution is in the ratio of 1 milliliter for every gram of frozen duodenum.
11. A method according to claim 1 wherein the alcohol is used in the ratio of 360 milliliters for every 200 grams of frozen duodenum.

12. A method of preparing heparinoids comprising, in proportion, the steps of:
 (a) thawing 200 grams of frozen duodenum;
 (b) cutting the thawed duodenum into small pieces;
 (c) passing the cut duodenum through a colloid mill;
 (d) extracting the milled duodenum using a solvent consisting of 19 grams of sodium hydroxide and 6.7 grams of common salt in 660 milliliters of water;
 (e) heating the solution to 50–70° C. for approximately 15 minutes while mechanically mixing it;
 (f) quickly cooling the solution to 45° C.;
 (g) keeping the solution standing overnight to facilitate removal of the fat layer;
 (h) removing the fat layer so formed;
 (i) filtering the remaining liquid;
 (j) neutralizing the filtrate to a pH of 7.8 with 40 milliliters of concentrated hydrochloric acid;
 (k) centrifuging the neutralized filtrate;
 (l) removing the resulting precipitate;
 (m) agitating the remaining clear liquid with 50 grams of zinc sulphate for a half hour after the salt is completely dissolved;
 (n) keeping overnight the formed grey precipitate;
 (o) centrifuging the precipitate;
 (p) removing the precipitate and discarding the liquid;
 (q) dissolving the precipitate in 200 milliliters of a standard buffer solution of pH 7.8;
 (r) agitating and heating said solution to 50–70° C. for a half hour;
 (s) centrifuging the agitated heated solution;
 (t) removing the residue;
 (u) adding 360 milliliters of 95% alcohol to precipitate the remaining liquid;
 (v) keeping the precipitate for two days;
 (w) centrifuging the precipitate which weighs about 2 grams;
 (x) drying the precipitate;
 (y) grinding the dried precipitate; and
 (z) sifting the ground precipitate.

No references cited.